United States Patent
McKelvie et al.

(10) Patent No.: US 9,459,805 B2
(45) Date of Patent: *Oct. 4, 2016

(54) BACKUP OF VOLATILE MEMORY TO PERSISTENT STORAGE

(71) Applicant: Amazon Technologies, Inc., Reno, NV (US)

(72) Inventors: Samuel James McKelvie, Seattle, WA (US); Michael David Marr, Monroe, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/012,608

(22) Filed: Feb. 1, 2016

(65) Prior Publication Data

US 2016/0154597 A1 Jun. 2, 2016

Related U.S. Application Data

(63) Continuation of application No. 13/893,153, filed on May 13, 2013, now Pat. No. 9,251,047.

(51) Int. Cl.
*G06F 12/02* (2006.01)
*G06F 11/14* (2006.01)
(Continued)

(52) U.S. Cl.
CPC ............. *G06F 3/0619* (2013.01); *G06F 1/30* (2013.01); *G06F 3/065* (2013.01); *G06F 3/067* (2013.01); *G06F 3/0623* (2013.01); *G06F 3/0646* (2013.01); *G06F 3/0685* (2013.01); *G06F 11/1441* (2013.01); *G06F 11/2015* (2013.01);
(Continued)

(58) Field of Classification Search
CPC ...... G06F 3/0653; G06F 3/067; G06F 12/00; G06F 12/0804; G06F 12/0868; G06F 12/0246; G06F 12/1408; G06F 12/16; G06F 2212/1032; G06F 2212/1052; G06F 2212/402; G06F 11/1441; G06F 11/2015; G06F 21/602; G06F 3/0619; G06F 3/0623; G06F 3/0646

See application file for complete search history.

(56) References Cited

U.S. PATENT DOCUMENTS 7,954,006 B1 5/2011 Mangipudi
9,251,047 B1 2/2016 McKelvie et al.
(Continued)

OTHER PUBLICATIONS

"Non Final Office Action dated Jun. 25, 2015" received in U.S. Appl. No. 13/893,153.
(Continued)

*Primary Examiner* — Michael Krofcheck
(74) *Attorney, Agent, or Firm* — Hogan Lovells US LLP

(57) ABSTRACT

Approaches for automatically backing up data from volatile memory to persistent storage in the event of a power outage, blackout or other such failure are described. The approaches can be implemented on a computing device that includes a motherboard, central processing unit (CPU) a main power source, volatile memory (e.g., random access memory (RAM)), an alternate power source and circuitry (e.g., a specialized application-specific integrated circuit (ASIC)) for performing the backup of volatile memory to a persistent storage device. In the event of a power failure of the main power source, the alternate power source is configured to supply power to the specialized ASIC for backing up the data in the volatile memory. For example, when power failure is detected, the ASIC can read the data from the DIMM socket using power supplied from the alternate power source and write that data to a persistent storage device.

20 Claims, 7 Drawing Sheets

(51) Int. Cl.
  *G06F 3/06* (2006.01)
  *G06F 12/00* (2006.01)
  *G06F 21/60* (2013.01)
  *G06F 11/20* (2006.01)
  *G06F 12/14* (2006.01)
  *G06F 1/30* (2006.01)
(52) U.S. Cl.
  CPC ........... *G06F 12/00* (2013.01); *G06F 12/1408* (2013.01); *G06F 21/602* (2013.01)

(56) References Cited

U.S. PATENT DOCUMENTS

| | | |
|---|---|---|
| 2009/0307499 A1 | 12/2009 | Senda |
| 2010/0180065 A1 | 7/2010 | Cherian et al. |
| 2011/0208998 A1 | 8/2011 | Hosaka |
| 2014/0156965 A1 | 6/2014 | Yang et al. |

OTHER PUBLICATIONS

"Notice of Allowance dated Oct. 17, 2015" received in U.S. Appl. No. 13/893,153.

BACKUP OF VOLATILE MEMORY TO PERSISTENT STORAGE

CROSS-REFERENCES TO RELATED APPLICATIONS

This application is a continuation of U.S. application Ser. No. 13/893,153 entitled "BACKUP OF VOLATILE MEMORY TO PERSISTENT STORAGE," filed May 13, 2013; which is incorporated herein by reference for all purposes.

BACKGROUND

In computing devices, volatile memory, such as random access memory (RAM), is computer-readable memory that requires a source of power to store the information. As long as power is supplied, volatile memory is able to maintain the information but once power is turned off, the information stored in the volatile memory is lost unless it has been backed up in some other manner. In contrast, non-volatile memory, also referred to as persistent storage, does not require a constant power supply to store the information and consequently data stored in non-volatile memory persists even after power has been turned off. Some examples of persistent storage include hard drives, disk storage, flash memory and read only memory (ROM). One potential advantage of volatile memory is that data stored in volatile memory is generally able to be accessed more quickly than in non-volatile memory. For example, a random-access device (e.g., RAM) allows stored data to be accessed quickly in any random order, whereas other data storage media such as hard disks, CDs, DVDs and magnetic tape (i.e. non-volatile memory) perform read and write operations on data slower and in a predetermined order (e.g., consecutively) inherently due to its mechanical design. In many cases, it would be desirable to take advantage of better performance and lower latency that volatile memory provides, while simultaneously ensuring the persistence of the data, such as in cases of power outage and other failures.

BRIEF DESCRIPTION OF THE DRAWINGS

Various embodiments in accordance with the present disclosure will be described with reference to the drawings, in which.

DETAILED DESCRIPTION

Figure 1:
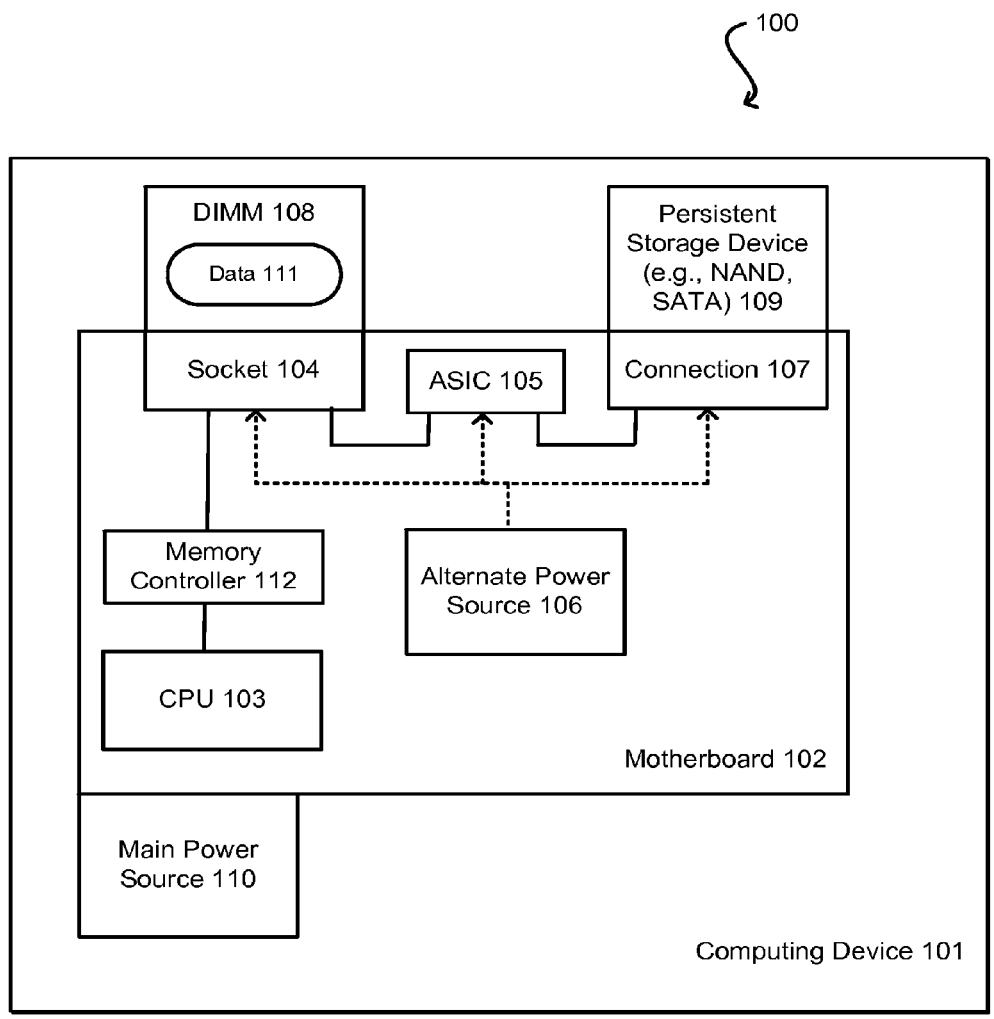
FIG. 1 illustrates an example of circuitry used to back up volatile memory to a persistent storage device in case of power failures, in accordance with various embodiments.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with various embodiments of the present disclosure may overcome one or more of the foregoing or other deficiencies experienced in conventional approaches for storing data in computer memory. In particular, embodiments described herein enable a way to automatically backup data from volatile memory to persistent storage in the event of a power outage, blackout or other such failure. The embodiments can be implemented on a computing device that includes a motherboard, central processing unit (CPU) a main power source, volatile memory (e.g., random access memory (RAM)), an alternate power source and circuitry (e.g., a specialized application-specific integrated circuit (ASIC)) for performing the backup of volatile memory to a persistent storage device.

In accordance with an embodiment, the motherboard includes at least one socket operable to receive a dual in-line memory module (DIMM), or other volatile memory, that is capable of maintaining electronic data. The CPU of the computing device is capable of performing read and write operations to the DIMM socket by utilizing a memory controller. The memory controller, as well as other components on the motherboard can generally be powered by the main power supply of the motherboard. A DIMM is one example (among many) of a volatile memory that is required to be electronically powered (e.g., by receiving power from the main power supply) in order to maintain the data stored thereon. In order to enable backup and recovery of the volatile memory during power failures, the computing device may further include an alternate power source capable of supplying power to the DIMM socket and/or other components. The alternate power supply can take the form of one or more capacitors, a battery (e.g., lithium ion battery), or other power source. In the event of a power failure of the main power supply, the alternate power supply is configured to supply power to the specialized ASIC for backing up the data from the volatile memory to persistent storage. For example, in response to detecting the power failure of the main power supply, the ASIC can read the data from the DIMM socket using power supplied from the alternate power source and write that data to a persistent storage device, such as a NAND (Negated AND) flash drive or a SATA (Serial ATA) drive. In some embodiments, the persistent storage device may be a dedicated storage device for recovering data during power failure events. In other embodiments, the persistent storage may be used to store data for other purposes, such as during normal operation of the computing device. For example, the persistent storage device may be a boot drive that has certain portions of the drive dedicated for storing data that is backed up by the ASIC in the event of a power failure.

In various embodiments, the operating system (OS) may define the memory ranges that are to be backed up during a power failure of the main power supply. For example, the OS may assign specific memory ranges to the DIMM socket(s) that is coupled to the specialized ASIC and the ASIC can copy all of the memory belonging to the DIMM socket to the persistent storage device in case of power failure. In some embodiments, the operating system of the computing device may provide an application programming interface (API) that allows one or more applications executing on the device to specify the data/memory that should be backed up in case of power failure. In yet other embodiments, the ASIC may be provisioned with certain specific ranges of memory that should be backed up in case of power failures.

In some embodiments, to protect the data written to the persistent storage device, the data may be encrypted using symmetric or asymmetric cryptography. The cryptographic key used to encrypt and/or decrypt the data may be stored locally in a secure store (e.g., in a trusted platform module (TPM)) on the computing device or retrieved over a network connection from a remote trusted computing device.

Once the data has been backed up to the persistent storage device, the computing device may recover the data during the process of rebooting the computing device or after the computing device has been rebooted. For example, at startup, such as when the computing device enters pre-boot execution environment (PXE), the basic input/output system (BIOS) may detect that a power failure and backup likely occurred and attempt to resurrect the state of the system from the state stored in the persistent storage device (e.g., NAND drive). The computing device may then resume operation from where it left off. As part of restoring the state of the system, the computing device may retrieve a cryptographic key and use the key to decrypt the data stored on the persistent storage device.

In at least some embodiments, the automatic backup of volatile memory to persistent storage can be utilized on one or more host computing devices within a multi-tenant and/or virtualized shared resource environment, often referred to as a cloud computing environment. Conventionally, in this type of environment, host computing devices utilize virtualization technology to provision one or more virtual machine instances that are associated with different customers of a service provider or other operator of the environment (e.g., cloud computing provider). These virtual machine instances are hosted on the computing device using a hypervisor (or other virtualization technology) and each virtual machine instance can contain a guest operating system, including a kernel, device drivers and other OS components. The host computing devices and other physical resources to host the virtual machines are usually provided by the service provider (or other operator of the environment) and reside in resource centers, such as a data centers, server farms, content delivery network (CDNs) points-of-presence (POPs) and the like. The virtual machines executing on the host computing device may execute one or more applications and the applications may utilize an API to specify which memory and data should be backed up during power failures.

FIG. 1 illustrates an example 100 of circuitry used to back up volatile memory to a persistent storage device in case of power failures, in accordance with various embodiments. In the illustrated embodiment, a computing device 101 includes a motherboard that is equipped with specialized circuitry (e.g., ASIC) 105 operable to perform the backup in case of power failures. The motherboard can be a printed circuit board (PCB) found in computing devices which holds many of the electronic components of the system, such as the central processing unit (CPU) and memory, and provides connectors for various peripheral devices. The motherboard is to be broadly interpreted and may include any integrated system or environment that is capable of housing the various components described herein. During normal execution of the computing device, the CPU 103 on the motherboard can perform read and write operations to RAM and/or other volatile memory, by utilizing a memory controller 112. For example, the memory controller 112 can enable the CPU 103 to write data 111 to one or more dual in-line memory modules (DIMMs), such as DIMM 108, over a socket 104. The memory controller 112, the CPU 103, the socket 104, as well as other components on the motherboard 102, are powered by a main power source 110 during normal operation. In the illustrated embodiment, the motherboard 102 further includes an ASIC 105 that is configured to back up (i.e., copy) the data 111 to a persistent storage device 109 in the event of a power failure of the main power supply 110.

The ASIC 105 can be coupled to an alternate power source 106, such as one or more capacitors or batteries located on the motherboard, which can be used to power each of: the ASIC 105, the DIMM socket 104 and the corresponding DIMM 108, the connection 107 and the persistent storage device 109 in the event of the power failure. In some embodiments, this may be performed by utilizing a switch that electrically isolates the DIMM socket and enables the ASIC to take over powering of the DIMM socket (e.g., without powering every other component on the motherboard) in order to allow the ASIC 105 to write the data 111 from the DIMM socket 104 to the persistent storage device 109. For example, a number of standard switch designs can be used, where the switch operates closed while power is being supplied to the switch and opens when the switch is no longer powered in order to allow power to flow from the other channel (e.g., alternate power source). Alternatively, the socket 104 to the DIMM 108 and the ASIC 105 may be isolated using other techniques in order to allow the data 111 to be written to the connection 107 to the persistent storage device.

In various embodiments, the connection 107 to persistent storage 109 can be on a dedicated pluggable NAND socket on the motherboard 102 created for the purpose of backing up volatile memory, or the connection may be a serial ATA (SATA) connection to a persistent storage device 109, or a serial attached SCSI (SAS) connection, or a universal serial bus (USB) drive, or a peripheral component interface (PCI) connection connected to a solid state drive (SSD). As previously mentioned, in other embodiments, the persistent storage 109 may also be used to store other data in addition to the data recovered by the ASIC 105. For example, the persistent storage device may be a removable boot drive from which the computing device can load and run an operating system (OS) or utility program, with certain portions of the boot drive dedicated for storing data that is backed up by the ASIC in the event of a power failure. In some embodiments, the persistent storage device may have its own battery/capacitor backup power, while, in other embodiments, the persistent storage device is powered by the alternate power source 106. Likewise, the capacitor/battery backup for the motherboard could also be in a pluggable socket and/or scaled with the amount of memory that needs to be backed up. Only the components of the system required to back up the commodity RAM to the persistent storage device need to be functional during power failure, and the logic/hardware of the ASIC 105 may be fixed function and not require the CPU 103 to be involved in the backup.

In one embodiment, the ASIC 105 may copy a single DIMM socket to persistent storage 109 on a single memory channel. In another embodiment, a subset (or all) of the DIMM sockets on a single memory channel can be persisted. In yet other embodiments, all DIMM sockets on a common memory controller (e.g., for a whole CPU), or all DIMM sockets on the motherboard for all CPUs may be persisted to the persistent storage device 109.

In various embodiments, the operating system of the computing device 101 may define the memory ranges that are managed by the DIMM socket 104 that is to be backed up. In these embodiments, the ASIC 105 can obliviously copy all memory being managed by the DIMM socket 104, without needing to know what data is being stored on that DIMM socket. Alternatively, if there are multiple DIMM sockets being protected, the ASIC 105 can select individual pages or ranges of memory that are to be backed up within those powered DIMM sockets, so that at runtime, the OS can selectively map ranges of memory into protected space. As such, in some embodiments, the ASIC 105 itself may be provisioned with specific ranges of memory that should be protected in the event of power failures.

As previously mentioned, the data written to the persistent storage device may be protected by using asymmetric or symmetric cryptography. Encrypting the data may be important in protecting against physical attacks on the computing device. For example, if a malicious user were to disconnect power to the computing device and physically remove the persistent storage device 109 from the computing device 101, it may be desirable that the data stored on the persistent storage device be encrypted in order to prevent the malicious user from gaining access to sensitive data. To accomplish this feature, in some embodiments, the specialized ASIC 105 can be provisioned with a cryptographic key that is used to encrypt the data stored on the persistent storage device 109. In other embodiments, the persistent storage device itself may be provisioned with a cryptographic key that can be used to encrypt the data copied to the persistent storage device 109. Many commodity drives (e.g., SATA drives, etc.) come provisioned for encryption/decryption of data and this functionality may be used to protect the data stored thereon.

Figure 2A:
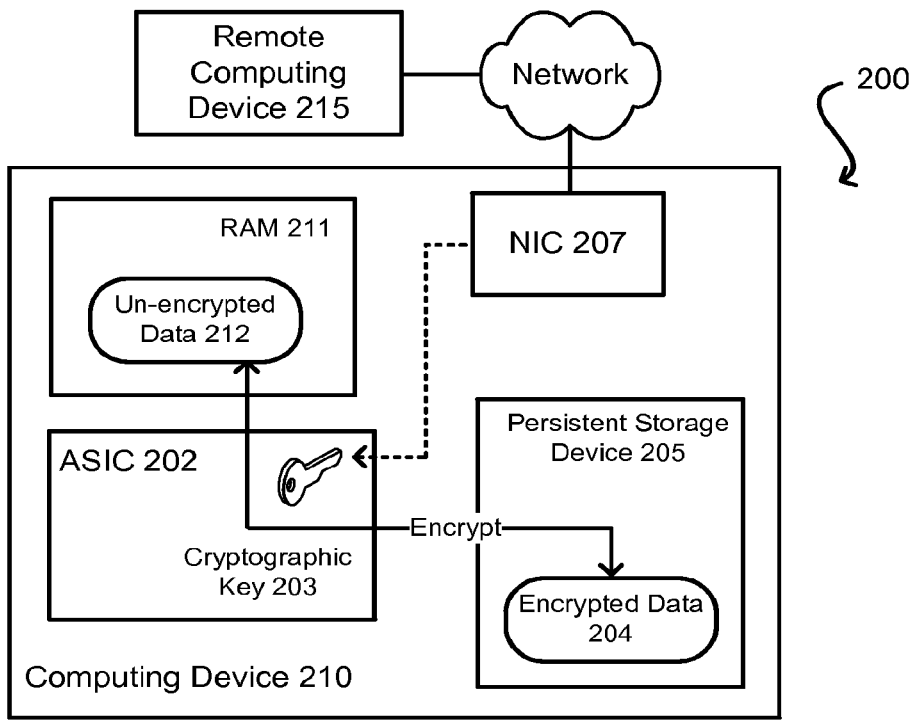
FIG. 2A illustrates an example of the ASIC retrieving a cryptographic key from a remote computing device over a network connection, in accordance with various embodiments.
Figure 2B:
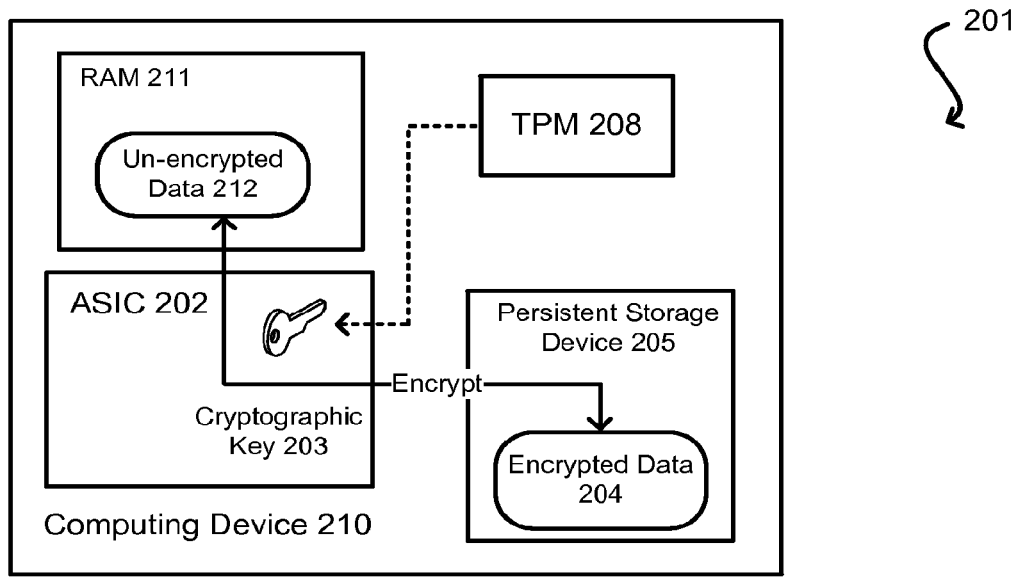
FIG. 2B illustrates an example of the cryptographic key being stored locally on the computing device, in accordance with various embodiments.

FIGS. 2A and 2B illustrate some examples of protecting data persisted to the persistent storage device, in accordance with various embodiments. For example, FIG. 2A illustrates an example 200 of the ASIC 202 receiving a cryptographic key 203 from a remote computing device 215 (e.g., trusted server, etc.) over a network connection. In this embodiment, the ASIC 202 may utilize a network interface card (NIC) 207 to establish a network connection with the remote computing device 215 and to obtain the cryptographic key 203 used to encrypt the data written to the persistent storage device 205. In the event of a power failure, the ASIC 202 can read the unencrypted data 212 from RAM 211, encrypt the data using the cryptographic key 203 and store the encrypted data 204 into the persistent storage device 205. Similarly, upon reboot after the power failure, the ASIC 202 can decrypt the encrypted data 204 stored in the persistent storage device 205 using a decryption key, and write the decrypted data back to the RAM 211 to restore the state of the computing device 210. The cryptographic key 203 may be obtained during normal operation of the computing device 210 rather than at the time of the power failure since the network interface card 207 (as well as other network components) may not have power during a power outage. For example, the key 203 may be downloaded upon initiating each session of an application hosted on the computing device 210. If asymmetric cryptography is utilized to protect the data, the key may be a public key used to encrypt the data, and it may correspond to a private key that can be used to decrypt the data encrypted using the public key. Alternatively, if symmetric cryptography is used, the cryptographic key may be a shared secret key that can be used to both encrypt and decrypt the data. In some embodiments, the key may expire at the end of each session, such that a new key is obtained from the remote computing device upon initiating each new session on the computing device 210.

FIG. 2B illustrates an example 201 of the cryptographic key being stored locally on the computing device 210, in accordance with various embodiments. In the illustrated embodiment, the computing device 210 includes a secure store, such as a trusted platform module (TPM) 208. The TPM 208 can be a secure crypto-processor capable of storing cryptographic keys that may be used to protect data on the computing device 210. In various embodiments, the TPM 208 may be used to generate and/or store the cryptographic key 203 used to encrypt the data written to the persistent storage device 205. For example, in the event of a power failure, the ASIC 202 may read the unencrypted data 212 from RAM 211, encrypt the data using the cryptographic key obtained from the TPM and write the encrypted data 204 to the persistent storage device 205. In some embodiments, the TPM 208 may generate the cryptographic key 203 during normal operation of the computing device 203, such as during a start of a session (e.g., OS session, application session, etc.). In other embodiments, the TPM 208 may be powered by the alternate power source and may generate the key when the power failure occurs.

It should be noted that although FIGS. 2A and 2B illustrate the cryptographic key being provided to the ASIC, this is not a requirement for all embodiments described herein. For example, in some embodiments, the cryptographic key may be generated by or provided to the persistent storage device (e.g., SATA drive) and the persistent storage device may utilize the key to encrypt the data. In other embodiments, the data may not be encrypted at all or may be secured using other techniques known in the art.

Once the data has been encrypted and written to the persistent storage device, the data may be utilized during a restart/reboot of the computing device to restore the state of the operating system, application data, or other information on the computing device. For example, at the time of rebooting the computing device, when the computing device enters a pre-boot execution environment (PXE), the CPU may retrieve a cryptographic key and use the key to decrypt the data stored in the persistent storage device. The cryptographic key may be retrieved from a local TPM store, or from a remote computing device over a network connection, as previously described. Once the data in the persistent storage device is decrypted, the CPU may write the data from the persistent storage device to the DIMM socket or other volatile memory in order to reinstate the state of the system on the computing device.

In various embodiments, the data backed up to the persistent storage device may include any journals for the file system on the computing device, the journals for the database system, any component performing indexing using global IDs for file systems or key-value storage systems, or any other data that is sensitive to loss during power failures.

In some embodiments, the memory pages to be backed up may be set up explicitly as part of an operating system service. In other embodiments, the application may request the data to be backed up specifically, such as by invoking an application programming interface (API) provided by the operating system. At reboot time, either the application or the OS may use the pages stored in the persistent storage as part of bringing itself back up in case of a power failure.

Figure 3:
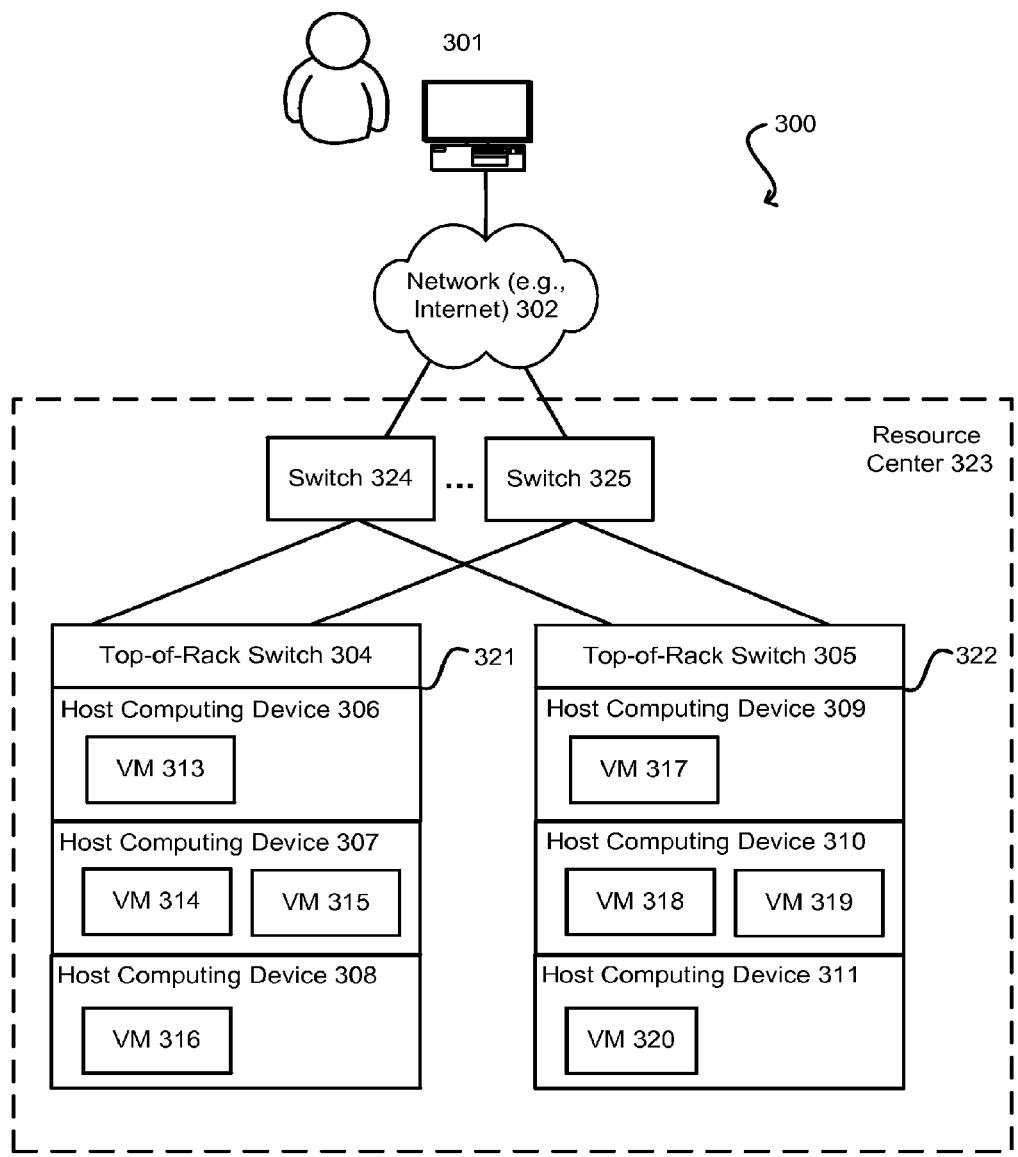
FIG. 3 illustrates an example of a resource center where the computing device may reside, in accordance with various embodiments.

As previously described, the ASIC specialized for backing up the volatile memory to persistent storage may be utilized on a host computing device, such as may be used in a resource center of a service provider or other operator of a multitenant computing environment (e.g., cloud computing environment). FIG. 3 illustrates an example 300 of a resource center where the computing device may reside, in accordance with various embodiments. In the illustrated embodiment, a service provider (e.g., a cloud computing resource provider) can maintain one or more resource centers 323 (e.g., data centers, server farms, etc.) that store the physical resources (e.g., host computing devices, etc.) of the service provider. These physical resources can be used to host a number of virtual machine instances or virtual servers that can be provided to users 301 over a network 302, such as the Internet. For example, when a user wants to execute an application using the physical resources of the service provider, he or she may request the service provider to provision a virtual machine for the user, which will be used to deploy and execute the application. As demand for the user's application grows, the user can request that more virtual machines be provisioned to balance the load, request creation of one or more virtual private networks (VPNs) and the like. Access to all of these resources provisioned for the user (e.g., customer) may be controlled by using one or more security policies specified by the user, as previously described.

In the illustrated example, the resource center 323 of the service provider may include one or more racks 321, 322 of host computing devices (306, 307, 308, 309, 310) wherein each host computing device on a particular rack is connected to a single top-of-rack (TOR) switch (304, 305). These TOR switches can be further connected to one or more other switches (324, 325) which enable the host computing devices to connect to the network. As used throughout this disclosure, a network can be any wired or wireless network of devices that are capable of communicating with each other, including but not limited to the Internet or other Wide Area Networks (WANs), cellular networks, Local Area Networks (LANs), Storage Area Networks (SANs), Intranets, Extranets, and the like. The resource centers can include any physical or logical grouping of resources, such as a data center, a server farm, content delivery network (CDN) point-of-presence (POP) and the like.

In accordance with an embodiment, each host computing device can host one or more virtual machine instances (313, 314, 315, 316, 317, 318, 319, 320) that have been provisioned for the customers of the service provider to execute the various applications and services on behalf of those customers. Each virtual machine can be provisioned with its own operating system (OS) including a kernel, drivers, process management and the like.

When a customer wishes to obtain a virtual machine instance, the customer can first submit a request to the service provider, indicating the type of VM they would like to use. The service provider may carry out the processes to provision the virtual machine instance which will be hosted on the physical resources (e.g., host computing devices) of the service provider. The virtual machine instance can then be used to execute the various applications and services on behalf of the customer, utilizing the resources of the service provider. In this environment, the host computing devices (306, 307, 308, 309, 310) can be equipped with the specialized circuitry for performing backup of volatile memory to persistent storage in case of power failures, as described throughout this disclosure. In some embodiments, the virtual machine instances may host applications that are capable of invoking an API provided by an operating system (or by the virtualization layer) to specify which data and volatile memory should be backed up to persistent storage by the specialized circuitry.

Figure 4:
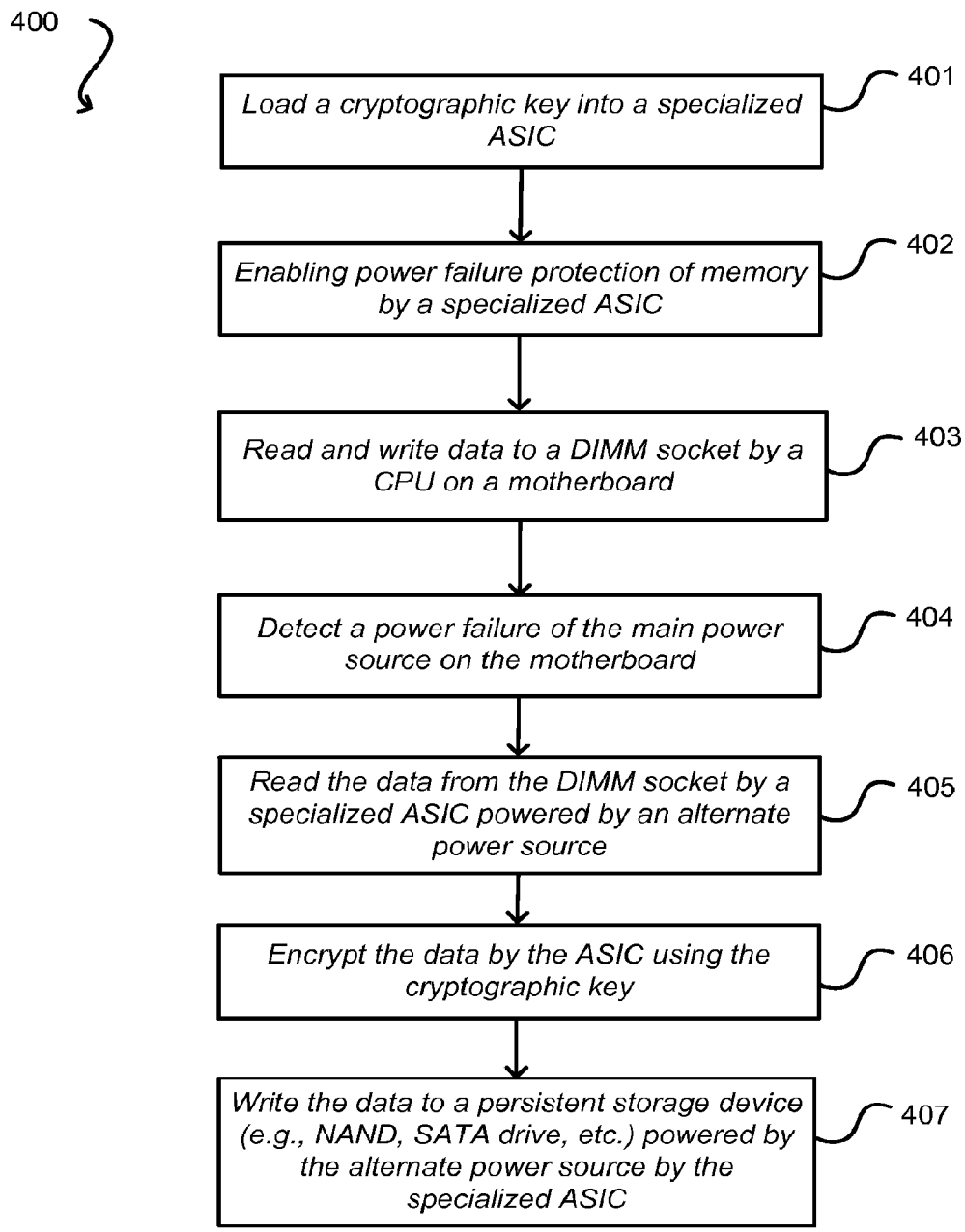
FIG. 4 illustrates an example process for backing up volatile memory to persistent storage during a power failure, in accordance with various embodiments.

FIG. 4 illustrates an example process 400 for backing up volatile memory to persistent storage during a power failure, in accordance with various embodiments. Although this figure as well as other process flows contained in this disclosure may depict functional operations in a particular sequence, the processes are not necessarily limited to the particular order or operations illustrated. One skilled in the art will appreciate that the various operations portrayed in this or other figures can be changed, rearranged, performed in parallel or adapted in various ways. Furthermore, it is to be understood that certain operations or sequences of operations can be added to or omitted from the process, without departing from the scope of the various embodiments. In addition, the process illustrations contained herein are intended to demonstrate an idea of the process flow to one of ordinary skill in the art, rather than specifying the actual sequences of code execution, which may be implemented as different flows or sequences, optimized for performance, or otherwise modified in various ways.

In operation 401, a cryptographic key is loaded onto the ASIC on a motherboard of a computing device. The cryptographic key can be used to encrypt the data that is to be saved into persistent storage in the event of a power failure. In operation 402, the ASIC is enabled for protection of data in the event of power failures. Enabling the ASIC causes the ASIC to be configured for reading data from the RAM in the event of a power failure and backing up the data to the persistent storage. There are certain time periods when it may not be desirable for the ASIC to automatically back up the data from RAM to persistent storage. For example, if a power failure occurs during booting process of the device, there may not yet be any useful data in RAM that should be backed up to the persistent storage device. As such, the ASIC may be disabled during the booting process of the device and enabled once the booting process has completed.

In operation 403, a CPU on the motherboard of the computing device may read and write data to a DIMM socket as part of normal operation of the computing device. The read and write operations may be performed by a memory controller powered by a main power source on the motherboard. In various embodiments, the computing device may further include an alternate power source, as well as the specialized ASIC operable to back up the data from the DIMM socket to the persistent storage device.

In operation 404, the device may detect a power failure of the main power source. In the event of detecting the power failure, the specialized ASIC reads the data from the DIMM socket by utilizing the alternate power source, as shown in operation 405. This may be performed by electronically isolating the DIMM socket (e.g., using a switch) and supplying power to the socket from the alternate power supply (e.g., one or more capacitors, battery, etc.).

In operation 406, once the data is read from the DIMM socket, the ASIC can encrypt the data using the cryptographic key that has been loaded onto the ASIC. Once the data is encrypted, the ASIC writes the data to the persistent storage device, as shown in operation 407. In various embodiments, the ASIC can be powered using the power supplied from the alternate power supply during the reading, encrypting and writing operations (operations 405, 406, 407). Subsequently, after the data has been backed up to the persistent storage device, it may be utilized to restore the state of the system when rebooting the computing device.

Figure 5:
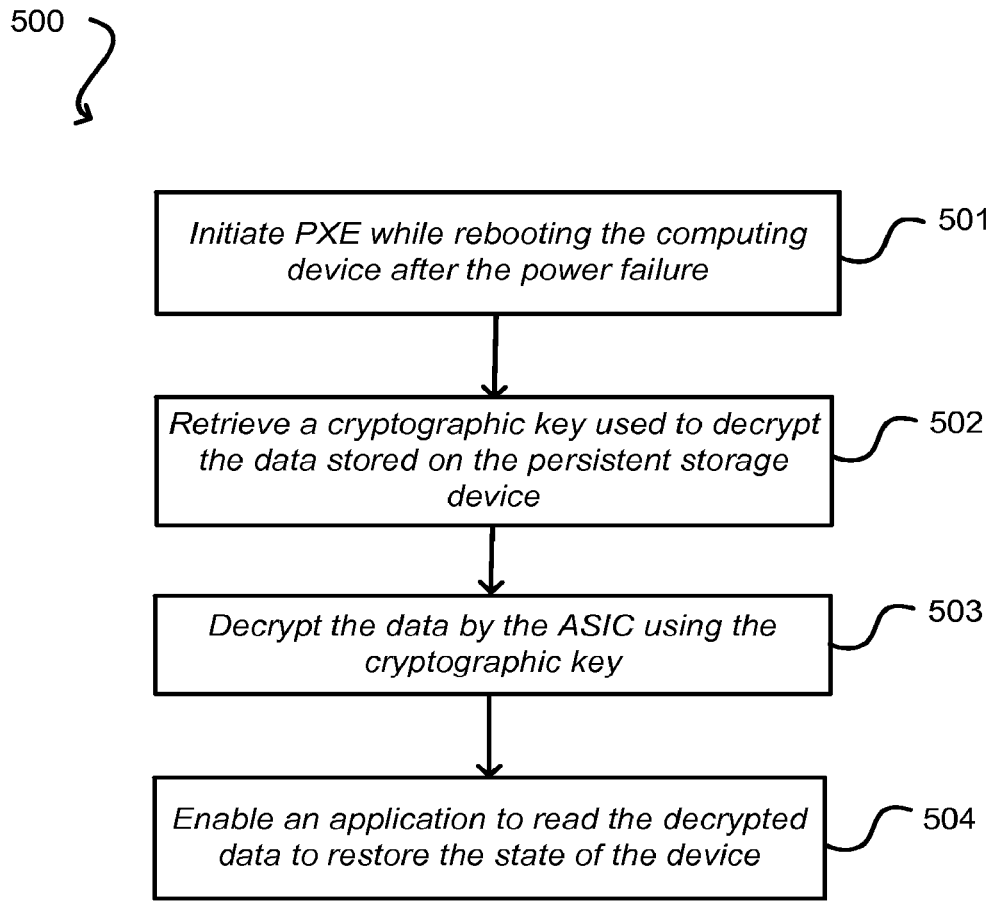
FIG. 5 illustrates an example process for rebooting the computing device after a power failure, in accordance with various embodiments.

FIG. 5 illustrates an example process 500 for rebooting the computing device after a power failure, in accordance with various embodiments. In operation 501, during reboot of the computing device after the power failure, the computing device may enter PXE, or other boot-up mode, where the BIOS of the computing device is loaded and where the CPU is operable to perform read and write operations to the DIMM socket, as well as other memory management operations.

In operation 502, the CPU retrieves a cryptographic key that can be used to decrypt 503 the data stored on the persistent storage device. The cryptographic key may be retrieved from a remote computing device over a network connection, or from a local secure store, such as a trusted platform module (TPM) on the computing device. In some embodiments the cryptographic key used to decrypt the data stored on the persistent storage device is the same key that was used to encrypt the data (i.e., in the case of asymmetric cryptography). In other embodiments, the key used to decrypt the data may be a different key (e.g., private key) than the key used to originally encrypt the data (public key).

In operation 504, the ASIC enables the application to read the data once the device has been rebooted in order to restore the state of the computing device. For example, the application may restore the journals of the file system, the journals of a database system, or other data that was copied to the persistent storage device upon power failure. In some embodiments, the restored data includes application data that was specified by the application executing on the computing device using the API provided by the operating system of the device.

In an alternative embodiment, the ASIC may provide a full snapshot restore of the data by reading the entire data from the persistent storage device and writing the data back to the same memory locations from which the data was originally obtained from at the time of the power failure. This automatic full restore can be performed even before the booting up of the computing device, or during the boot up process. However, if the data was automatically restored before the booting of the device in this manner, the boot up process (e.g., PXE) may subsequently modify various memory locations which may contain the restored data. In some cases, it may be desirable to preserve the restored data without allowing the PXE (or other booting process) to modify the data. Thus, in those instances, the ASIC may delay the writing (i.e., restoring) the data from the persistent storage device back to the memory until the computing device has finished rebooting (as described in FIG. 5). Once the device has finished rebooting, the ASIC may provide an out-of-band way for the application running on the computing device to read the data from the persistent storage and to restore the state as needed. The ASIC may provide a way to restore the data piecewise, without necessarily restoring the entirety of the data at once. For example, the application may select only the portions of data that the application deems useful for restoring the state of the device. In some embodiments, the ASIC may decrypt the data on behalf of the application by using the cryptographic keys provisioned on the ASIC, as previously described.

Figure 6:
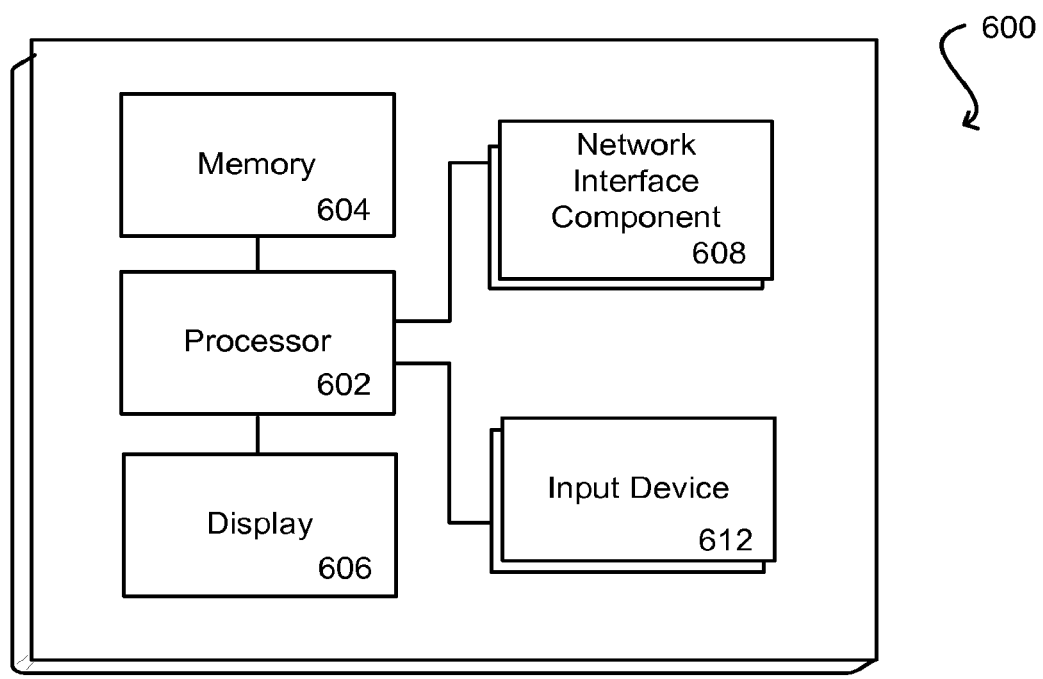
FIG. 6 illustrates a logical arrangement of a set of general components of an example computing device that can be utilized in accordance with various embodiments.

FIG. 6 illustrates a logical arrangement of a set of general components of an example computing device 600. In this example, the device includes a processor 602 for executing instructions that can be stored in a memory device or element 604. As would be apparent to one of ordinary skill in the art, the device can include many types of memory, data storage, or non-transitory computer-readable storage media, such as a first data storage for program instructions for execution by the processor 602, a separate storage for images or data, a removable memory for sharing information with other devices, etc. The device typically will include some type of display element 606, such as a touch screen or liquid crystal display (LCD), although devices such as portable media players might convey information via other means, such as through audio speakers. As discussed, the device in many embodiments will include at least one input element 612 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 600 of FIG. 6 can include one or more network interface elements 608 for communicating over various networks, such as a Wi-Fi, Bluetooth, RF, wired, or wireless communication systems. The device in many embodiments can communicate with a network, such as the Internet, and may be able to communicate with other such devices.

Figure 7:
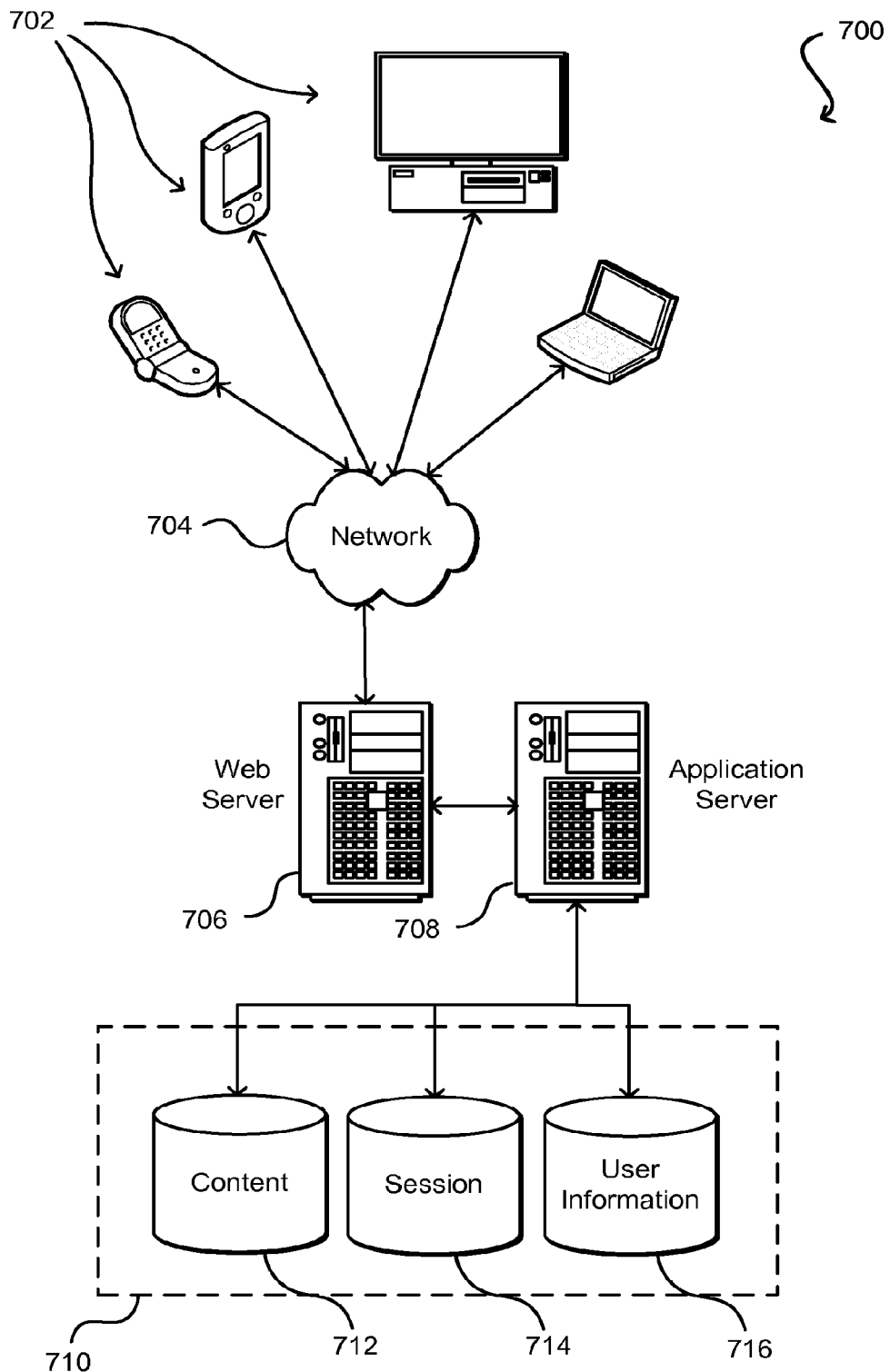
FIG. 7 illustrates an example of an environment for implementing aspects in accordance with various embodiments.

As discussed, different approaches can be implemented in various environments in accordance with the described embodiments. For example, FIG. 7 illustrates an example of an environment 700 for implementing aspects in accordance with various embodiments. As will be appreciated, although a Web-based environment is used for purposes of explanation, different environments may be used, as appropriate, to implement various embodiments. The system includes an electronic client device 702, which can include any appropriate device operable to send and receive requests, messages or information over an appropriate network 704 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 706 for receiving requests and serving content in response thereto, although for other networks an alternative device serving a similar purpose could be used, as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 702 and the application server 708, can be handled by the Web server 706. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing production data 712 and user information 716, which can be used to serve content for the production side. The data store also is shown to include a mechanism for storing log or session data 714. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 702. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
    a first power source; and
    a first computing component configured to receive power from the first power source, the first computing component comprising:
        a first memory component configured to store data and receive power from the first power source;
        a second computing component configured to enable protection of the data stored on the first memory component in an event of a power failure of the first power source;
        a second power source configured to provide power to the second computing component, a second memory component, and the first memory component, wherein in the event of the power failure of the first power source, the second computing component is configured to:
            disable protection of the data stored on the first memory component at least until reboot has completed;
            retrieve storage instructions from the second memory component configured to identify a range of memory address locations associated with the second memory component to write the data;
            encrypt the data by using a cryptographic key to generate encrypted data, the cryptographic key associated with a decryption key used to decrypt the encrypted data;
            read the encrypted data from the first memory component;
            write the encrypted data to the range of memory address locations associated with the second memory component using power supplied by the second power source;
            decrypt the encrypted data stored in the second memory component using the cryptographic key to generate decrypted data;
            detect a reboot; and
            load the decrypted data onto the first memory component.

2. The computing device of claim 1, wherein the first power source comprises a main power source, the first computing component comprises a motherboard, the first memory component comprises a dual in line memory module (DIMM), the second computing component comprises an application specific integrated circuit (ASIC), the second memory component comprises persistent storage, and the second power source comprises an alternate power supply.

3. The computing device of claim 1, further comprising:
    a first connection component configured to couple to the first memory component; and
    a second connection component configured to couple to the second memory component, wherein the second power source is configured to provide power to the first connection component and the second connection component, and wherein in the event of the power failure of the first power source, the second computing component is configured to read and write data over the first connection component and the second connection component by utilizing the power provided by the second power source.

4. The computing device of claim 1, further comprising:
    an operating system loaded into the first memory component of the computing device, the operating system configured to execute one or more applications, the operating system configured to provide an application programming interface (API) configured to receive a request that includes storage instructions from a customer of a service provider hosting a multitenant computing environment, the storage instructions specifying the range of memory address locations and portions of the data to backup in the event of the power failure of the first power source.

5. The computing device of claim 1, wherein the data written to the second memory component is encrypted using the cryptographic key provisioned on at least one of: the second computing component or the second memory component.

6. The computing device of claim 1, wherein the first computing component further includes:
    a central processing unit (CPU) configured to read and write operations to the second memory component over a first contention component couple to the first memory component, wherein upon rebooting the computing device after the power failure of the first power source, the CPU is configured to:

retrieve the cryptographic key from at least one of: a secure store on the computing device or a remote computing device; and restore at least a portion of the first memory component by writing the data stored in the second memory component to the first memory component over a first connection component.

7. The computing device of claim 1, wherein the second computing component is configured to write the data to the second memory component over a second connection component comprising at least one of:

a negated AND (NAND) socket, a serial ATA (SATA) connection, a peripheral component interconnect (PCI) connection, a universal serial bus (USB) connection, or a serial attached SCSI (SAS) connection.

8. The computing device of claim 1, wherein the second power source further comprises at least one of: one or more capacitors, or a battery.

9. The computing device of claim 1, wherein in the event of a reboot after the power failure of the first power source, the second computing component is configured to:

disable protection of the data until the reboot has completed;

initiate a pre-boot execution environment (PXE) of the computing device;

obtain the decryption key from at least one of: a trusted platform module (TPM) on the computing device, or a remote computing device over a network connection; and load the decrypted data onto the first memory component while the computing device is in the pre-boot execution environment (PXE).

10. A computer implemented method, comprising:

detecting a power failure of a first power source on a first computing component of a computing device, the first power source configured to provide power to a first memory component of the computing device, the first memory component configured to store data, a second computing component being configured to enable protection of the data stored on the first memory component in an event of a power failure of the first power source;

disabling protection of the data on the first memory component at least until reboot has completed;

retrieving storage instructions from a second memory component, the storage instructions specifying a range of memory address locations associated with the second memory component to write the data;

encrypting the data by using a cryptographic key to generate encrypted data, the cryptographic key associated with a decryption key used to decrypt the encrypted data;

reading the encrypted data from the first memory component;

writing the encrypted data to the range of memory address locations associated with the second memory component using power provided by a second power source, the second power source configured to provide power to the second computing component, a second memory component, and the first memory component in the event of the power failure to the first power source;

decrypting the encrypted data stored in the second memory component using the cryptographic key to generate decrypted data;

detecting a reboot; and loading the decrypted data onto the first memory component.

11. The computer implemented method of claim 10, wherein writing the data to the second memory component further comprises:

encrypting the data on the second memory component using the cryptographic key obtained from at least one of: a trusted platform module (TPM) located on the computing device, or a remote computing device.

12. The computer implemented method of claim 11, further comprising:

rebooting the computing device after the power failure of the first power source;

and restoring at least a portion of the first memory component by writing the data from the second memory component to the first memory component.

13. The computer implemented method of claim 10, wherein the computing device further comprises:

providing an operating system loaded into the first memory component of the computing device, the operating system configured to execute one or more applications, the operating system configured to provide an application programming interface (API) configured to receive a request that includes storage instructions from a customer of a service provider hosting a multitenant computing environment, the storage instructions specifying the range of memory address locations and portions of the data to backup in an event of a power failure of the first power source.

14. The computer implemented method of claim 10, wherein the first computing component further includes a central processing unit (CPU) configured to read and write operations to the second memory component over a first contention component coupled to the first memory component, wherein upon rebooting the computing device after the power failure of the first power source, the method further comprising:

retrieve, by the CPU, the cryptographic key from at least one of: a secure store on the computing device or a remote computing device; and restore, by the CPU, at least a portion of the first memory component by writing the data stored in the second memory component to the second memory component over a first connection component.

15. The computer implemented method of claim 10, wherein a second computing component is configured to write the data to the second memory component over a second connection component comprising at least one of:

a negated AND (NAND) socket, a serial ATA (SATA) connection, a peripheral component interconnect (PCI) connection, a universal serial bus (USB) connection, or a serial attached SCSI (SAS) connection.

16. A non-transitory computer readable storage medium storing one or more sequences of instructions executed by one or more processors to:

detect a power failure of a first power source on a first computing component of a computing device, the first power source configured to provide power to a first memory component of the computing device, the first memory component configured to store data, a second computing component being configured to enable protection of the data stored on the first memory component in an event of a power failure of the first power source;

disable protection of the data on the first memory component at least until reboot has completed;

retrieve storage instructions from a second memory component, the storage instructions specifying a range of memory address locations associated with the second memory component to write the data;

encrypt the data by using a cryptographic key to generate encrypted data, the cryptographic key associated with a decryption key used to decrypt the encrypted data;

read the encrypted data from the first memory component;

write the encrypted data to the range of memory address locations associated with the second memory component using power provided by a second power source, the second power source configured to provide power to the second computing component, a second memory component, and the first memory component in the event of the power failure to the first power source;

decrypt the encrypted data stored in the second memory component using the cryptographic key to generate decrypted data;

detect a reboot; and load the decrypted data onto the first memory component.

17. The non-transitory computer readable storage medium of claim 16, wherein the instructions further comprise instructions to:

provide an operating system loaded into the first memory component of the computing device, the operating system configured to execute one or more applications, the operating system configured to provide an application programming interface (API) configured to receive a request that includes storage instructions from a customer of a service provider hosting a multitenant computing environment, the storage instructions specifying the range of memory address locations and portions of the data to backup in an event of a power failure of the first power source.

18. The non-transitory computer readable storage medium of claim 16, wherein the storage instructions are written to the second memory component and encrypted using the cryptographic key provisioned on at least one of: a second computing component or the second memory component.

19. The non-transitory computer readable storage medium of claim 18, wherein the instructions further comprise instructions to:

retrieve the cryptographic key from at least one of: a secure store on the computing device or a remote computing device; and decrypt the storage instructions using the cryptographic key.

20. The non-transitory compute readable storage medium of claim 18, wherein the instructions further comprise instructions to:

detect a reboot after the power failure of the first power source;

disable protection of the data until the reboot has completed;

initiate a pre-boot execution environment (PXE) of the computing device;

obtain the decryption key from at least one of: a trusted platform module (TPM) on the computing device, or a remote computing device over a network connection; and load the decrypted data onto the first memory component while the computing device is in the pre-boot execution environment (PXE).

* * * * *